United States Patent [19]

Akerlow

[11] 3,941,536
[45] Mar. 2, 1976

[54] ROTARY DRUM PELLETIZER WITH REMOVABLE LINERS

[75] Inventor: Earl V. Akerlow, Grafton, Wis.

[73] Assignee: Akerlow Industries, Inc., Grafton, Wis.

[22] Filed: May 23, 1974

[21] Appl. No.: 472,789

[52] U.S. Cl.............................. 425/222; 259/81 R
[51] Int. Cl.² ............................................ B29B 1/02
[58] Field of Search.................... 425/222; 264/310; 259/81 R; 249/102, 112; 220/63 R, 65

[56] References Cited
UNITED STATES PATENTS

| | | | |
|---|---|---|---|
| 1,122,822 | 12/1914 | Venable | 249/102 X |
| 2,778,056 | 1/1957 | Wynne | 425/222 X |
| 2,984,861 | 5/1961 | Cox et al. | 425/222 |

*Primary Examiner*—Robert D. Baldwin
*Attorney, Agent, or Firm*—Joseph P. House, Jr.

[57] ABSTRACT

A rotary drum pelletizer has multiple internal cone frustum baffles. The cone frustum baffles are interconnected serially to constitute a removable liner replaceably received within the drum and interchangeable with one or another of a series of such liners, each having different cone frustum baffle configurations. Means are provided to releasably fasten said liners to said drum. By interchanging one liner for another, the pelletizer drum can be adapted to process particulate material of widely varying characteristics to achieve desired pellet sizes, shapes and consistency.

3 Claims, 5 Drawing Figures

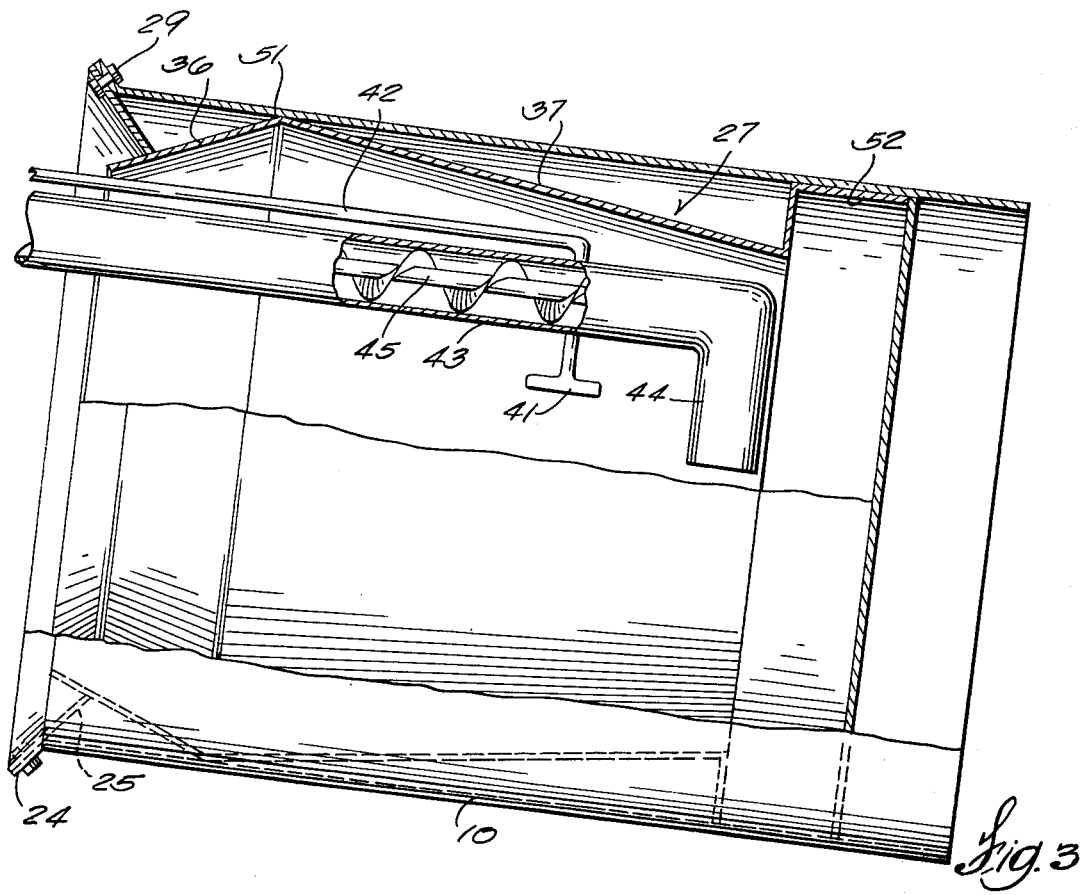
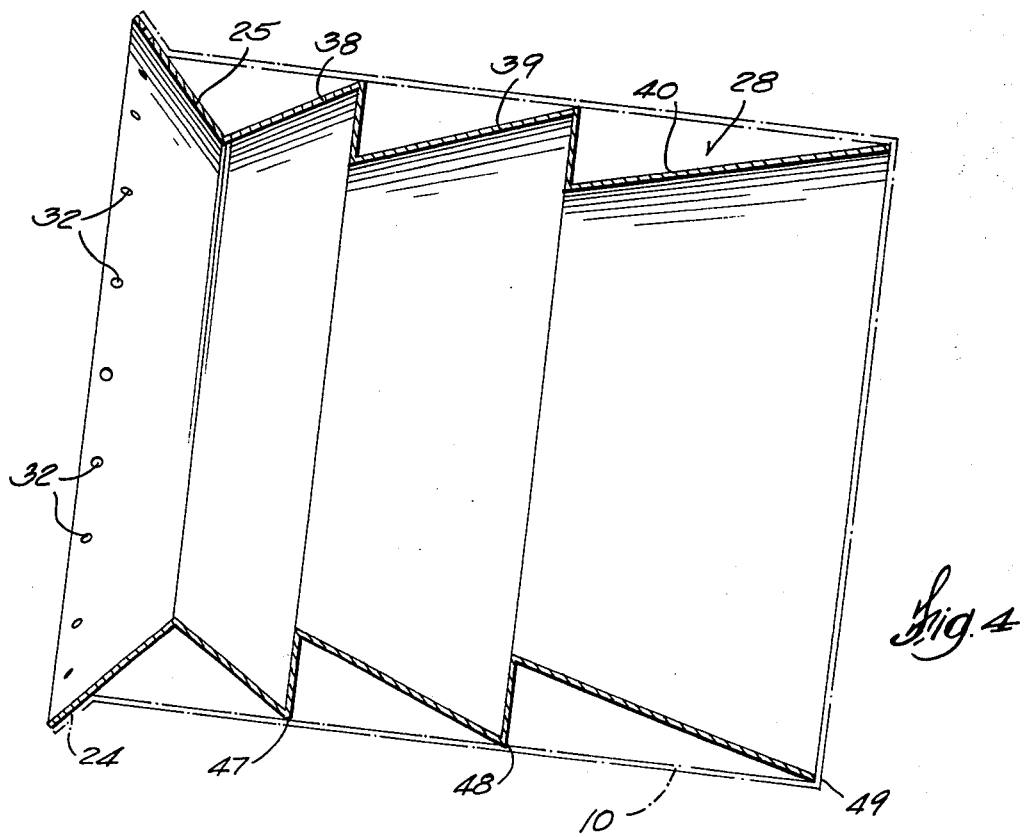

ROTARY DRUM PELLETIZER WITH REMOVABLE LINERS

BACKGROUND OF THE INVENTION

Heretofore pelletizing drums have been provided with cone frustum baffles of a specific configuration. Each drum is designed for processing a specific particulate material and for producing pellets having a specific configuration and consistency. Different drums must be provided for processing substantially different particulate material or when a substantially different pellet configuration and consistency is desired.

SUMMARY OF THE INVENTION

In accordance with the present invention, the same basic drum structure is used, regardless of the type of particulate material involved and the desired pellet configuration and consistency. Different treatment capability in the same drum structure is provided by utilizing a series of interchangeable liners, each having its own specific cone frustum baffle configuration for the precise and accurate processing of specifically different particulate material and for producing pellets of the size, consistency and configuration which is desired.

These liners are interchangeably received within the same drum, thus greatly reducing the cost of providing for a full and varied treatment of a wide range of particulate materials. The replaceable liners simply slide into the drum and are releasably fastened thereto. In preferred embodiments, the drum and liners are provided with complementary flanges which can be coupled together by bolts or other releasable fastening means.

Other objects, advantages and features of the invention will appear from the disclosure hereof.

DESCRIPTION OF THE DRAWINGS

FIG. 3 is a side view, partly in vertical cross section, showing the drum of the pelletizer of FIG. 1 in which a liner having a cone frustum baffle configuration different from the one shown in FIG. 1 is incorporated.

FIG. 4 is a view similar to FIG. 3 showing the liner having a different cone frustum baffle configuration.

DESCRIPTION OF THE PREFERRED EMBODIMENTS

Figure 1:
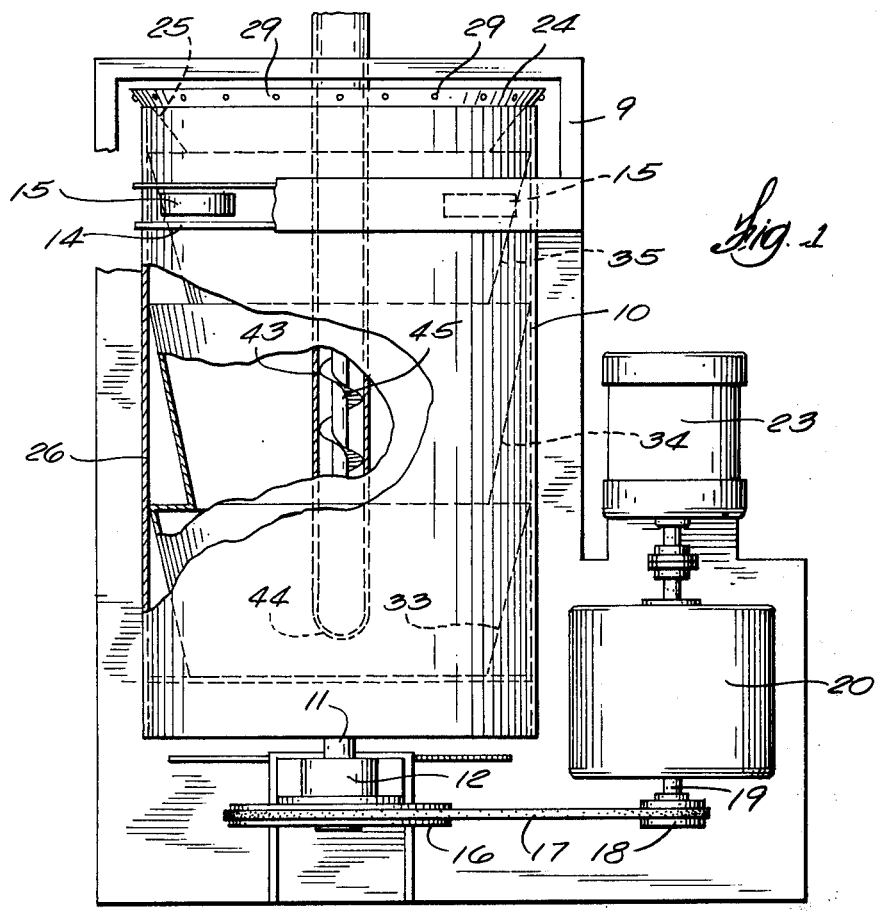
FIG. 1 is a top view of a pelletizer embodying the present invention, portions thereof being broken away to expose details in cross section.
Figure 2:
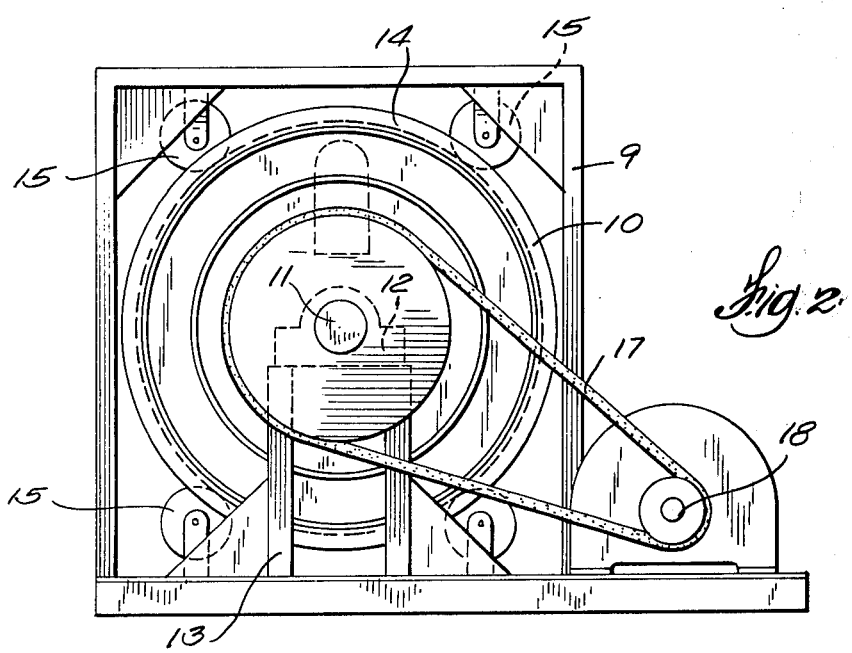
FIG. 2 is an end view of the pelletizer of FIG. 1.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The rotary drum pelletizer is basically conventional, the invention hereof residing in series of interchangeable liners adapted to be received within the drum. A frame 9 provides general support for the pelletizer. Drum 10 is provided at one end with a supporting and driving shaft 11 which is journaled for rotation in a bearing block 12 mounted on subframe 13. Near its other end the drum 10 is provided with an external track ring 14 to receive the support and guide wheels 15 mounted on the frame 9.

Shaft 11 is extended beyond the bearing block 12 and is provided with a drive pulley 16 for a drive belt 17 from the pulley 18 on the output shaft 19 of gear box 20 of drive motor 23.

The axis of the drum 10 is typically tilted slightly as indicated in FIGS. 3 and 4. Thus the discharge end of drum 10 is typically at a slightly higher level than its receiving end. Mechanism not illustrated herein can be utilized to adjust the tilt angle, if desired.

The discharge end of the drum 10 is provided with a conical flange 24 and this flange mates with a complementary conical flange 25 on any one of a series of drum liners such as liners 26, 27, 28 which are illustrated respectively in FIGS. 1, 3 and 4. The drum liners 26, 27, 28 are merely, examples of a great variety of different drum liners which are interchangeably received within the drum 10 and are releasably fastened thereto by couplings such as the bolts 29 received through corresponding holes 32 formed in the respective flanges 24, 25. In the illustrated embodiments, flanges 24, 25 are at a 45° angle to the drum axis, although this is not critical. Flange 25 on the liners also comprises a pellet discharge flange at the discharge end of the drum 10.

Each liner 26, 27, 28 and others not illustrated, are made up of serially interconnected cone frustum baffles which will have various and diverse configurations, slope angles, length, height, etc., depending upon the type of particulate material to be processed therein and the configuration, structure, consistency, etc., of the pellets to be formed therefrom.

Because of the broad adaptability of the pelletizer of the present invention to handle a wide variety of particulate materials, comprehensive enumeration thereof is not possible. However, typical examples include fly ash, blast furnace dust, paper fiber and fillers, asbestos and cement dust, waste treatment sludge, plastic dust, fermentation residue, foundry and core sands, animal litter, feed grains, etc.

The drum liner 26 of FIG. 1 has three cone frustums 33, 34, 35 of unequal length and all pitched downwardly toward the discharge end of the drum.

The drum liner 27 of FIG. 3 has a relatively short cone frustum 36 near the exit end of the drum 10 which is pitched in one direction and a much longer cone frustum 37 which is pitched oppositely to cone frustum 36.

Liner 28 of FIG. 4 hhas three cone frustum baffles 38, 39, 40, each one progressively longer and of less pitch from the outlet end of the drum near the left of FIG. 4 to the inlet end near the right of FIG. 4. These cone frustums are pitched oppositely to those shown in FIG. 1.

The three liners 26, 27, 28 are merely illustrative of a wide variety of differently configured liners, each designed for the specific treatment of a specific particulate material and to produce pellets of a specific size, consistency and configuration.

The drum pelletizer has an inlet duct 43 with an optional inlet spout 44 which deposits particulate material near the closed or receiving end of the drum. As illustrated in FIGS. 1 and 3, the inlet pipe 43 may be provided internally with a screw conveyor 45.

A liquid binder such as water or special liquid chemical additive is typically sprayed into the interior of the drum, along with the particulate material. The specific type of spray nozzle and its location within the drum will vary, depending on circumstances. For purposes of illustration, spray nozzle 41 supplied with liquid from pipe 42 is shown in FIG. 3.

Figure 5:
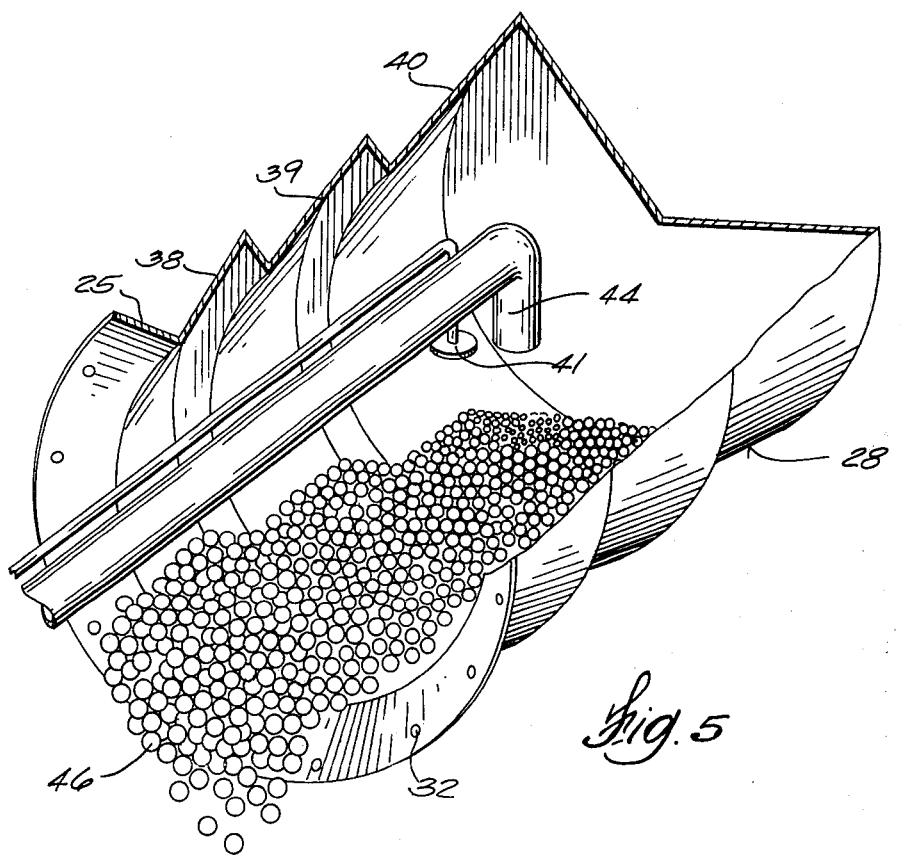
FIG. 5 is a fragmentary perspective view illustrating a pelletizer of the present invention in which pellets have been formed from particulate material.

As the drum is rotated by motor 23, the liner will also rotate and the rolling and cascading action of the particulate material as it is wetted with liquid from nozzle 41 will roll the material into pellets 46, as illustrated in FIG. 5.

The pellets are discharged out of the open end of the drum and over the discharge flange 25 of the liner and are collected on a conventional discharge conveyor, receiving pan or the like (not shown).

The liners are supported at their discharge ends by the couplings 29. The cone frustums within the liner will typically have ring portions of the same diameter as the inside wall of the drum 10, such as is illustrated at 47, 48, 49 in FIG. 4. These ring portions bear against the inner surface of the wall of the drum 10, thus to firmly support the liner on the drum throughout its length. Liner 27 of FIG. 3 only has one such ring portion 51. Accordingly, this liner has at its closed end a support ring 52 which abuts against the inner surface of the drum 10 to support the rear end of the liner 27.

I claim:
1. Pelletizing apparatus comprising a rotary drum, a series of liners each of which removably fits into said drum, each of said liners having a different configuration of internal multiple cone frustum baffles, each such configuration adapted to provide a different treatment capability for particulate material processed through the drum, interconnecting means respectively on the drum and liners for releasably fastening said liners to the drum, each of said liners having at least one ring portion longitudinally spaced from said interconnecting means and which bears against the inner surface of the wall of the drum to support its liner in the drum, and means for feeding particulate material to one end of the drum and for discharging pellitized material from the other end of the drum.

2. The improvement of claim 1 in which said interconnecting means comprises complementary flanges on said drum and liners and couplings between said flanges.

3. The improvement of claim 2 in which said flange on each said liner comprises a pellet discharge flange at the discharge end of the drum.

* * * * *